Sept. 2, 1969  A. D. HALLAMAN  3,464,743
TRACTION DEVICE
Original Filed Oct. 31, 1966

INVENTOR.
ALLAN D. HALLAMAN
BY W. A. Shira, Jr.
ATTY.

United States Patent Office 3,464,743
Patented Sept. 2, 1969

3,464,743
TRACTION DEVICE
Allan D. Hallaman, Akron, Ohio, assignor to The B. F. Goodrich Company, New York, N.Y., a corporation of New York
Continuation of application Ser. No. 590,755, Oct. 31, 1966. This application Aug. 12, 1968, Ser. No. 754,101
Int. Cl. B62d 55/24
U.S. Cl. 305—35   9 Claims

ABSTRACT OF THE DISCLOSURE

An endless traction belt of resilient elastomer reinforced with textile material and having spaced holes for receiving the teeth of one or more driving sprockets. The traction surface of the belt comprises peripherally spaced, transverse ribs of trapezoidal cross section with one side face of each rib extending at an acute angle to the surface of the belt and the opposite side face disposed at an angle of 90° to the belt surface. The radially outer face of the ribs may have an anti-skid pattern.

---

This application is a continuation of Ser. No. 590,755, filed Oct. 31, 1966, now abandoned.

This invention relates to a traction device and, more particularly, to an endless belt adapted to be employed as the driving means for vehicles of the type designed for operation upon snow, sand, mud, or materials of similar characteristics.

Vehicles adapted to operate where no roads are provided and over surfaces covered with loose snow, sand, mud or materials of similar characteristics frequently employ traction devices in the form of endless tracks or belts to support and propel the vehicle. In recent years, small light-weight vehicles of this type have been developed wherein the said traction device is an endless belt of reinforced elastomeric material. One such traction device is disclosed in U.S. Patent 2,899,242. In that patent, the traction device is transversely reinforced by spaced metal rods so disposed that the outer surface of the device is formed with transversely extending semicylindrical projections. In use, it has been found that a traction device with such a surface configuration frequently does not provide adequate traction, especially in loose snow or similar material. Moreover, the manufacture of such a belt presents a number of difficulties with respect to placing and maintaining of the reinforcements in proper locations during construction and cure of the belt so that these will not interfere with the placing of equally spaced openings through the belt for engagement of the teeth by sprocket wheels or other driving means.

The principal object of the invention is, therefore, to provide an improved endless traction device for vehicles adapted to operate upon snow, sand, mud, and materials of similar characteristics, which device is formed of elastomer provided with lateral reinforcement and having an outer surface formed with a traction pattern of ribs integrally formed in the elastomer of the belt and extending transversely thereof, and characterized in that the said ribs are substantially of trapezium shape in cross section with one transversely extending side face of each of the ribs disposed at an acute angle to the surface of the belt and the opposite side face of each rib disposed at an angle of 90 degrees to the surface of the belt.

A more specific object of the invention is to provide an improved traction device as defined in the preceding paragraph wherein the radially outer surface of each rib is provided with an anti-skid pattern that preferably comprises alternate ridges and troughs extending across the ribs parallel to the transversely extending side faces.

A further object of the invention is to provide a traction device as defined in either of the preceding objects and wherein the lateral reinforcement of the belt comprises textile material with the belt having openings therethrough in peripherally aligned equally spaced relationship with the spacing of the openings being independent of the location of the ribs.

Other and further objects of the invention will be apparent to those skilled in the art from the following description of the presently preferred embodiment, and certain modifications thereof, described with reference to the accompanying drawing, forming a part of the application, and in which.

Figure 1:
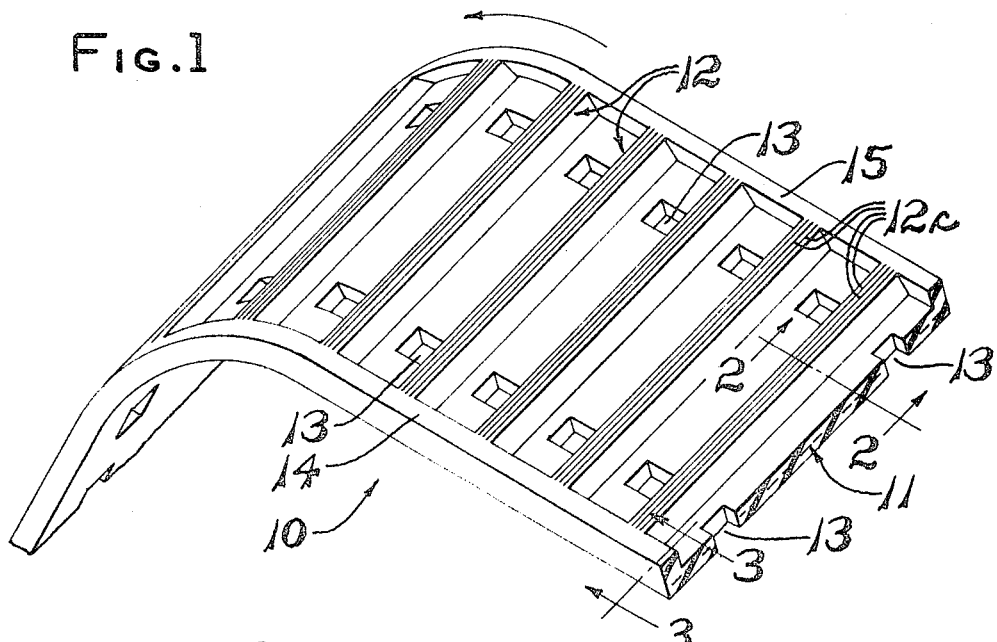
FIG. 1 is a fragmentary perspective view of a portion of the novel traction device illustrating the presently preferred embodiment thereof.
Figure 3:
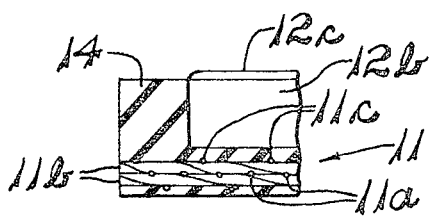
FIG. 3 is a fragmentary sectional view taken substantially on the section indicating line 3—3 of FIG. 1.
Figure 2:
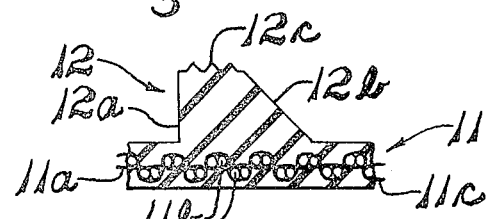
FIG. 2 is a fragmentary sectional view taken substantially on the line 2—2 of FIG. 1.

The presently preferred embodiment of the traction device embodying this invention, as illustrated in FIGS. 1–3, inclusive, comprises an endless belt 10 formed of elastomeric material reinforced by a textile material 11. The radially outer or ground-engaging surface of the belt 10 is provided with a traction pattern of ribs 12 integrally molded into the elastomer of the belt and extending transversely thereof parallel to and peripherally spaced from each other. In accordance with this invention, these ribs are each generally trapezium in cross section having one transversely extending side face 12a disposed at an angle of 90 degrees to the surface of the belt and the opposite side face 12b of the rib extending at an acute angle to the surface of the belt. The angularity of the side face 12b is preferably in the order of 45 degrees but may be varied somewhat from that value. The radially outer or ground-contacting surface of each rib is, in the embodiment illustrated in FIGS. 1–3, preferably provided with a traction increasing pattern 12c which, in the form illustrated, comprises alternate ridges and troughs extending along the ribs parallel to the said transversely extending side faces.

The traction device is applied to the vehicle on which it is employed in a manner such that the faces 12a of the ribs are the leading side faces in the direction of the travel of the vehicle with the faces 12b of the ribs constituting the trailing side faces. That is to say, the side faces 12b are the last portions of the ribs 12 to leave contact with the ground surfaces. As thus employed, the traction device provides greatly improved traction over that heretofore attainable with prior endless belts of similar nature since the faces 12a of the belt compact any loose material in the driving surface increasing the density of the material and providing, in effect, rack teeth on which the vehicle is propelled forwardly by movement of the belt. The trapezium cross section of the ribs facilitates penetration of the ribs into the surface material without loss of this compacting action. Moreover, this shape of the ribs has a self-cleaning action since as the ribs pass out of the tractive surface, the angularity of the face 12b allows a gently sloping parting line for maximum self-cleaning without sacrifice of tractive forces. Furthermore, the angularity of this face enables the provision of maximum thickness and strength at the base of the rib while reducing the weight thereof which is of prime importance in light-weight snow vehicle construction.

The traction pattern 12c provided on the outer faces of the ribs 12 further increases the traction action of the ribs in material which is penetrated thereby. Moreover, this pattern provides for increased traction on surfaces into which the ribs cannot penetrate as, for example, when the vehicle is operated on hard surfaces rather than upon the loose material for which it is primarily designed.

Motive power for operation of the belt from the vehicle may be transmitted thereto by any known expedient including surfaces molded or otherwise provided on the radially inner surface of the belt and cooperating with driving elements carried by the vehicle. In the preferred embodiment, however, the belt is provided with a plurality of openings 13 therethrough in peripherally aligned equally spaced relationship for engagement by a toothed driving member on the vehicle. Although these openings are shown as disposed in two axially spaced rows and located intermediate the ribs 12, the nature of the belt is such that it is not necessary that the openings 13 be so located. Instead, they can be so positioned as to partly or totally fall within the region also occupied by the ribs 12 should this be found necessary or desirable for a particular installation. This is possible in accordance with the belt of this invention since the reinforcing material for the belt is of such nature and so located that it does not fall within the ribs 12 and, hence, the openings 13 and ribs 12 may be located as may be expedient without loss of tractive force or reinforcement of the belt. Hence, the belt may be made in imperforate form and cut or punched by the vehicle manufacturer to provide the driving openings 13 in desired locations.

The fabric reinforcement 11 employed in the belt, which facilitates the aforementioned location of the openings, independently of the locations of the ribs, is of textile material comprising transversely extending members which are of greater stiffness than the longitudinally extending members. Such a material, for example, is of the type disclosed and claimed in the copending application of Alvin W. Spicer, Ser. No. 554,160, filed May 31, 1966 and which is assigned to the assignor of this application. As herein shown, the fabric 11 comprises warp tension elements 11a preferably formed of nylon and provided on either side with nylon monofilaments 11b serving as a filler or weft. These monofilaments may be disposed in pairs and twisted with a wrapping of cotton or rayon to increase their bulk. The warp and weft cords are united by light binder cords 11c which may be formed of rayon, nylon or polyester. The filler members or weft 11b are of sufficient diameter to provide lateral stiffness of the belt.

In addition to the transversely extending track ribs 12, the traction device 10 may also be provided with one or more ribs extending peripherally of the belt to prevent lateral skidding of the vehicle on which the device is employed and/or to increase the rigidity of the device. In the embodiment shown in FIGS. 1–3, two such ribs 14 and 15 are provided, these being shown adjacent the side edges of the belt. In the illustrated embodiment, the ribs 14 and 15 are rectangular in cross section but, if desired, these may likewise be trapezium in cross section with an acute angle in the order of 45 degrees on the side facing the center of the belt.

Figure 4:
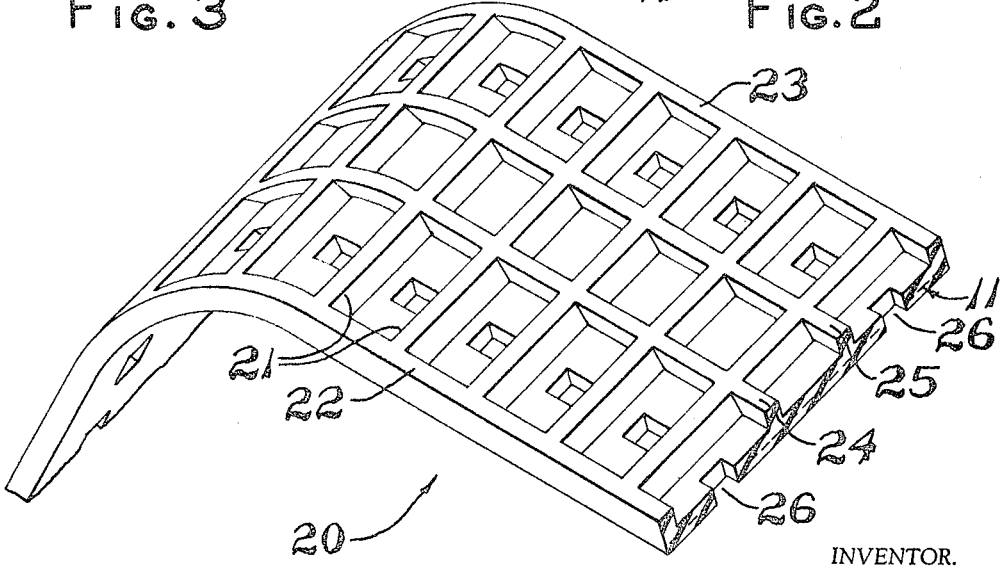
FIG. 4 is a fragmentary perspective view similar to FIG. 1 but illustrating another embodiment of the invention.

FIG. 4 illustrates a traction device 20 which is a modification of the traction device illustrated in FIGS. 1–3, inclusive. As shown in FIG. 4, the traction device is an endless belt reinforced with textile fabric in the same manner as described for the belt illustrated in FIGS. 1–3. The device 20 is provided with a plurality of transversely extending ribs 21 which are trapezium in cross section and correspond to the ribs 12 of FIGS. 1–3 except that the radially outer faces are smooth rather than having the traction increasing pattern 12c of the ribs 12. The belt 20, like the belt 10, is provided with peripherally extending ribs 22 and 23, respectively, adjacent the edges of the belt and corresponding to the ribs 14 and 15 of the belt 10. In addition, the belt 20 is provided with peripherally extending ribs 24 and 25 similar to the ribs 22 and 23 but axially spaced inwardly therefrom. The ribs 24 and 25 may be of rectangular cross section as shown or may have one or both sides inclined at an acute angle to the surface of the belt. The belt 20, like the belt 10, is provided with a plurality of openings 26 for engagement by a toothed driving member, the spacing of which openings may be as shown in the drawing or at other locations including those intersecting one or more of the ribs 21–25, inclusive.

The novel belt of this invention is made in a manner similar to that of conveyor belts. For example, a layer of elastomeric material is first disposed upon a suitable building drum and one or more layers of the reinforcing fabric 11 with the stiffening members 11b extending axially of the drum, and hence transversely of the completed belt are next applied. A layer of elastomeric material of sufficient thickness for formation of the previously described ribs therein is then placed over the fabric, which may or may not be first coated with an adhesive or cement. The belt thus prepared is then placed in contact with a mold which, during vulcanization of the elastomeric material, causes the formation therein of the aforementioned ribs such as 12, 14, 15 and 21–25. The openings, such as 13 and 26, may be cut in the belt after it is molded or may be formed therein prior to molding, if desired.

The dimensions of the traction device will vary for the size of the vehicle on which it is to be employed and the invention is not limited to specific dimensions for the belt. However, in general, the height of the ribs should be approximately ½ the width of the ribs at the base. As a specific example, it may be mentioned that a belt having a periphery in the order of 113 inches had an overall width of about 15 inches. That belt had 57 ribs with the ribs spaced approximately two inches apart and with each rib having a width at the base of 0.75 inch and a transverse top dimension of 0.178 inch. The height of the ribs was 0.187 inch.

It will be apparent that, although a specific embodiment and certain modifications of the invention have been described in detail, the invention is not limited to the specifically illustrated and described constructions since variations may be made without departing from the principles of the invention.

I claim:

1. A traction device comprising an endless belt of elastomer provided with lateral and longitudinal reinforcement located within said belt and having an outer surface formed with a traction pattern comprising a plurality of ribs integrally formed in the elastomer and extending generally transversely of the belt parallel to and peripherally spaced from each other, characterized in that the said lateral reinforcement comprises a plurality of discrete transversely extending members extending substantially the width of the belt and being of greater rigidity than the longitudinal reinforcement with the said members disposed in parallel relationship in sufficient proximity that they are located both between and beneath said ribs, and the said ribs are substantially of trapezium shape in cross section with one transversely extending side face of each of said ribs disposed at an acute angle to the surface of the belt and the opposite side face of each rib disposed at an angle of substantially 90 degrees to the surface of the belt, the radially outer face of each rib being generally parallel to the portion of the surface of the belt between the ribs and having a longitudinal extent in the order of one-half that of the base of the rib, the said device having a plurality of openings therethrough in peripherally aligned equally spaced relationship for engagement by a toothed driving member with the spacing between the said transversely extending members being less than that between said openings.

2. The traction device as defined in claim 1 wherein the acute angle of the said one side face of the ribs is in the order of 45 degrees.

3. The traction device as defined in claim 1 wherein the radially outer face of each rib is provided with an anti-skid pattern.

4. The traction device as defined in claim 3 wherein the said anti-skid pattern is provided by alternate ridges and troughs extending along the ribs parallel to the said transversely extending side faces.

5. The traction device as defined in claim 1 further characterized by the provision of at least one peripherally extending rib.

6. The traction device as defined in claim 1 and further comprising at least one rib extending peripherally of the belt adjacent each lateral edge thereof.

7. The traction device as defined in claim 6 and further comprising at least one rib extending peripherally of the belt parallel with and spaced from each of the said peripherally extending ribs adjacent the edges of the belt.

8. The traction device as defined in claim 1 wherein the transverse ribs each has a height approximately one-half its peripheral extent as measured at the base of the rib.

9. The traction device as defined in claim 1 wherein the said lateral reinforcement comprises monofilaments of textile material.

References Cited

UNITED STATES PATENTS

| | | | |
|---|---|---|---|
| D. 161,234 | 12/1950 | Bigelow | 152—209 X |
| 1,409,577 | 3/1922 | Reyoum. | |
| 2,109,691 | 3/1938 | D'Ayguesvives | 152—209 |
| 2,308,327 | 1/1943 | Darragh. | |
| 2,560,307 | 7/1951 | Slemmons | 305—38 X |
| 2,577,471 | 12/1951 | Law. | |
| 2,899,242 | 8/1959 | Bombardier. | |
| 3,282,630 | 11/1966 | Harrison. | |
| 3,120,409 | 2/1964 | Beall | 305—38 X |
| 3,144,930 | 8/1964 | Michels | 198—193 |
| 3,285,677 | 11/1966 | Marier | 305—38 |

RICHARD J. JOHNSON, Primary Examiner

U.S. Cl. X.R.

74—231

PO-1050
(5/69)

UNITED STATES PATENT OFFICE
CERTIFICATE OF CORRECTION

Patent No. 3,464,743      Dated September 2, 1969

Inventor(s) Allan D. Hallaman

It is certified that error appears in the above-identified patent and that said Letters Patent are hereby corrected as shown below:

Column 2, line 52, "surfaces" should read ---surface---.
Column 4, line 33, "0.75" should read ---0.375---; line 45, "forcement" should read ---forcements---.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents